(12) United States Patent
Zhou

(10) Patent No.: US 6,476,086 B1
(45) Date of Patent: Nov. 5, 2002

(54) COALESCENCE ENHANCED GRAVITY SEPARATION OF IRON CATALYST FROM FISCHER-TROPSCH CATALYST/WAX SLURRY

(75) Inventor: Peizheng Zhou, Lawrenceville, NJ (US)

(73) Assignee: Hydrocarbon Technologies, Inc., Lawrenceville, NJ (US)

(*) Notice: Subject to any disclaimer, the term of this patent is extended or adjusted under 35 U.S.C. 154(b) by 0 days.

(21) Appl. No.: 09/825,802

(22) Filed: Apr. 4, 2001

(51) Int. Cl.[7] .......................... C07C 27/00; C07C 27/06
(52) U.S. Cl. ................ 518/719; 518/700; 518/710; 518/724; 518/720; 518/728; 208/950
(58) Field of Search ................ 518/700, 710, 518/724, 728, 719, 720; 208/950

(56) References Cited

U.S. PATENT DOCUMENTS

| | | | |
|---|---|---|---|
| 4,605,678 A | 8/1986 | Brennan et al. | 518/700 |
| 5,520,890 A | 5/1996 | Lorentzen et al. | 422/197 |
| 5,827,903 A | 10/1998 | White et al. | 518/710 |
| 6,068,760 A | 5/2000 | Benham et al. | 208/950 |
| 6,096,789 A | 8/2000 | Clerici et al. | 518/706 |

Primary Examiner—Jafar Parsa
(74) Attorney, Agent, or Firm—Fred A. Wilson

(57) ABSTRACT

Fine iron-based catalyst particles from. Fischer-Tropsch (F-T) synthesis processes are effectively separated from catalyst/liquid/wax slurry by contacting and/or mixing the slurry with a coalescence enhancing treating solution to facilitate gravity separation and settling of such catalyst, and thereby yield a substantially clean hydrocarbon liquid/wax product. The treating solution includes a surface tension reducing agent, an agglutinating agent, and a coalescing agent each in selected proportions in aqueous solution. Useful mixing and settling conditions are 10–250° C. temperature, 0–500 psig pressure and treating solution to slurry volume ratio of 0.5–5:1, with the settling time for at least about 90% and preferably substantially all of the catalyst fines after the mixing step being less than about 15 minutes. The treating solution can be desirably recovered and reused in the F-T synthesis process, and the recovered catalyst either recycled or disposed as desired.

15 Claims, 1 Drawing Sheet

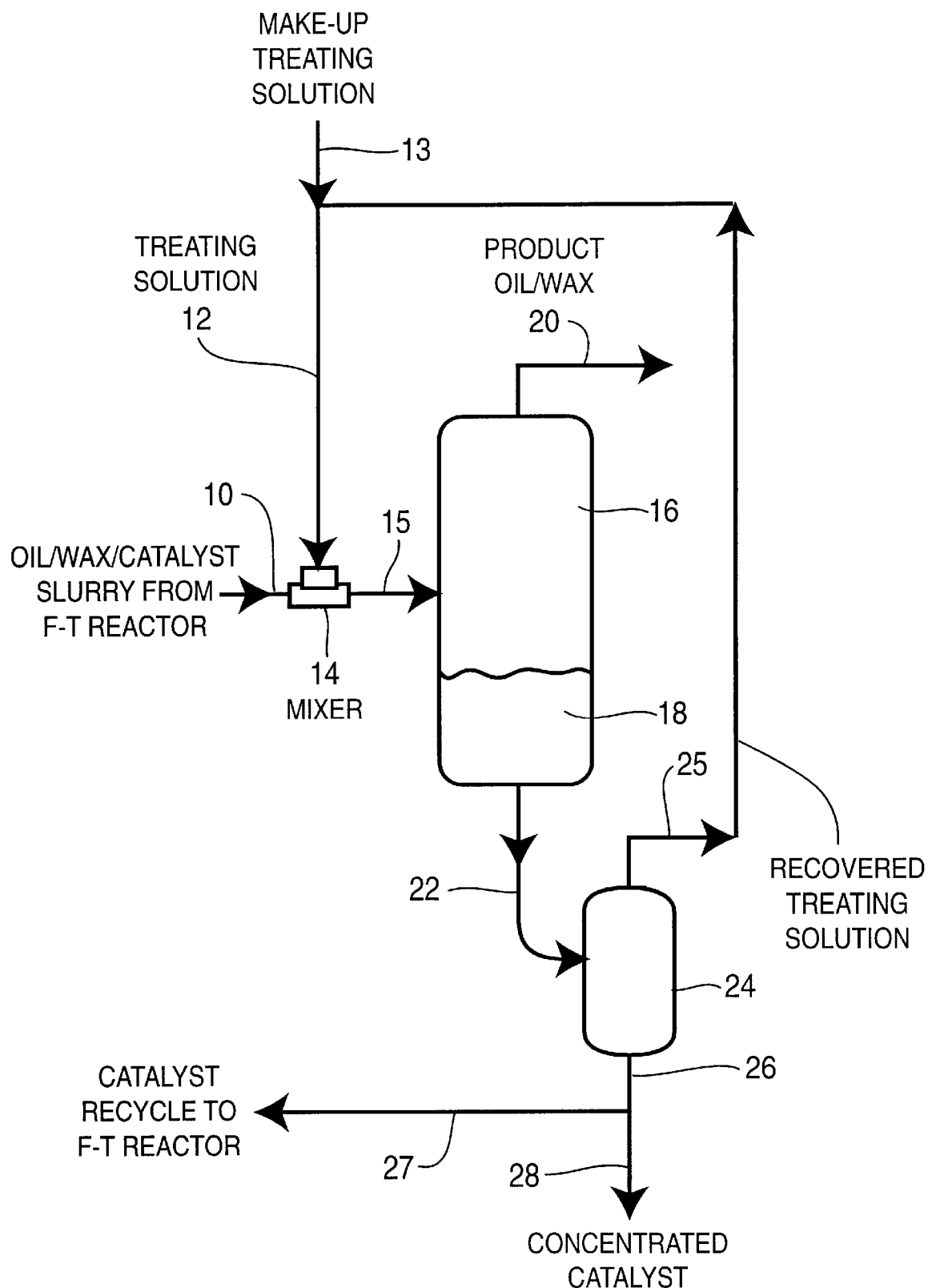

COALESCENCE ENHANCED GRAVITY SEPARATION OF IRON CATALYST FROM FISCHER-TROPSCH CATALYST/WAX SLURRY

BACKGROUND OF THE INVENTION

This invention pertains to coalescence enhanced gravity separation of fine sized iron-based catalyst from catalyst/waxy reactor effluent slurries in Fischer-Tropsch synthesis processes. It pertains particularly to such enhanced separation and gravity settling of the fine catalysts by utilizing contact with a coalescence enhancing treating solution to facilitate the catalyst separation and rapid settling from the catalyst/wax reactor effluent slurries.

Iron-based catalysts selected for use in Fischer-Tropsch (F-T) process slurry-bed reactors have initial particle size up to about 100 microns, but undesirably break down very easily under the reaction conditions into very fine particles having sizes in the 1–2 micron and even sub-micron ranges. These extremely fine catalyst particles make desired separation of such catalyst fines from the F-T process waxy liquid products including paraffin wax very difficult. Such catalyst separation problems result in unacceptable product quality and undesired loss of catalyst, and have thus far prevented commercialization of iron-catalyzed slurry-phase Fischer-Tropsch synthesis processes.

Various catalyst/wax separation techniques have been studied, including conventional gravity settling, filtration (both internal and external), centrifugation including hydrocloning, solvent extraction and magnetic separation; however, they have not been commercially successful. For example, U.S. Pat. No. 4,605,678 to Brennan et al discloses separating Fischer-Tropsch (F-T) process catalyst fines from the waxy product by passing it through a high gradient magnetic field, so that the catalyst is retained by a magnetized filter element. U.S. Pat. No. 5,520,890 to Lorentzen discloses separating slurry phase containing catalyst from liquid product utilizing vertical filtering tubes in a reactor. U.S. Pat. No. 5,827,903 to White et al discloses a method for separating catalyst fines from F-T synthesis wax products by dense gas and/or liquid extraction steps. U.S. Pat. No. 6,068,760 to Benham et al discloses a method for separating catalyst particles from F-T process wax product by utilizing a specially shaped dynamic settler device. Also, U.S. Pat. No. 6,096,789 to Clerici discloses a F-T synthesis process for producing hydrocarbons in which fine catalyst particles are separated from a liquid slurry utilizing dual staged hydroclone units. Sasol in South Africa is apparently the only producer that has disclosed successful use of an internal filter having a proprietary complicated design for their slurry-bed iron catalyst F-T reactors. Thus, the iron catalyst/wax separation techniques investigated for F-T synthesis processes are either not able or efficient enough to meet the requirements for producing clean hydrocarbon liquid products, or are too complicated and expensive to be economically justified. However, a coalescence enhanced settling technique that facilitates separation of the iron-based catalyst fines from the F-T synthesis process catalyst/wax reactor effluent slurry in an effective and economic manner is very desirable, and is now being provided.

SUMMARY OF INVENTION

This invention provides an improved method for separation and gravity settling of fine iron-based catalyst in catalyst/wax reactor effluent slurries in Fischer-Tropsch (F-T) synthesis processes for producing substantially clean hydrocarbon liquid/wax products by utilizing a coalescence enhanced separation and gravity setting procedure for the catalyst fines. The invention utilizes a special aqueous treating solution for contacting or mixing with a catalyst/liquid/wax slurry withdrawn from a F-T process reactor, and induces enhanced coalescing of the catalyst fines into larger clusters or globules, thereby enabling their effective separation from the catalyst/wax slurry medium by rapid gravitational settling.

Suitable aqueous treating solutions for this invention include two or more chemical agents selected for providing reduced surface tension in the catalyst/liquid/wax slurry, along with catalyst agglomerating and coalescing steps for the fine catalyst as utilized for the method of this invention. Such treating solutions include an interfacial or surface tension reducing component, an agglomerating or agglutinating component, and a coalescing component for the catalyst fines. Although the catalyst sedimentation mechanism is not entirely understood, it is believed that the interfacial tension reducing component lowers surface tension of water so that it wets the catalyst fines which are held in an unstable oil/water emulsion formed by the agglomerating and/or coalescing components. Surface tension reducing agents include alcohols such as ethanol and 2-propanol which help reduce interfacial tension, and components such as EDTA, methyl cellulose and methyl sulfoxide facilitate agglomeration and coalescence of the fine catalyst particles into larger clusters or globules, and thereby facilitate rapid settling of the catalyst particles in the liquid/wax slurries.

The coalescence enhanced separation and settling method or procedure of this invention requires bringing the aqueous treating solution into intimate contact with the catalyst/liquid/wax slurry by a suitable mixing step. Such mixing step can be, provided by hydraulic, mechanical, magnetic, or ultrasonic mixing means located either upstream from or within an upper portion of a pressurizable settling container or tank so as to form the catalyst clusters or globules, followed by rapid gravitational settling of the catalyst clusters/globules formed. In the settling container, the catalyst/wax slurry and treating solution are maintained in a liquid form or state to facilitate such intimate contact and catalyst settling. Following such mixing step, the separation and settling of the fine catalyst for most catalyst/wax slurries usually occurs in the container relatively rapidly in less than about 10 minutes, and preferably in less than 6 minutes, so as to provide at least about 90% separation and settling of the catalyst, and preferably to provide a substantially clear hydrocarbon liquid/wax product. However, for catalyst/wax slurries containing very high molecular weight hard wax products, such separation and settling of the coalesced catalyst may require up to 15 minutes.

Proper chemical composition for the treating solution is essential for successful separation and gravity settling of the catalyst fines from the liquid/wax slurry product for this invention. This proprietary treating solution preferably includes three component agents in aqueous solution as follows:

Agent A—an surface tension reducing agent selected for reducing interfacial tension between the catalyst fine particles and hydrocarbon liquid/wax product, and which is usually an alcohol, from $C_1OH$ to $C_{10}OH$ monoalcohols, and di-alcohols, e.g., ethylene glycol, and such. Concentration in the treating solution should be 1–80 vol. %.

Agent B—an agglomerating or agglutinating agent, such as acrylic acid, methyl cellulose, polyacrylic acid and such. Concentration in the treating solution should be 0.001–10 vol. %

Agent C—A coalescing agent for fine catalyst particles, such as glycerin, methyl sulfoxide, 2, 3-dimercapto-1-propanesulfonnic acid (DMPS), meso-2, 3-dimerecaptosuccinic acid (DMSA), ethylenediamine-tetraacetic acid (EDTA), diethylenetriamine pentaacetic acid (DTPA), desferrioxamine, dithiocarbarnate (DTC), penicillamine, and Deionized water provides the remainder of the treating solution.

This method for effective catalyst/wax separation by coalescence enhanced gravity settling of the fine catalyst from the liquid/wax slurry product and the treating solution can be performed under the following ranges of operating or treating conditions:

Catalyst/wax slurry temperature between 10° C. and 250° C., with the temperature being at least 10° C. above the melting point and at least 10° C. below the boiling point of the treating solution, and preferably at 20–200° C. slurry temperature.

Settling tank pressure for treated catalyst/wax slurry sufficient to maintain the treating solution in liquid state, and usually from atmospheric up to about 500 psig, and preferably 5–400 psig tank pressure.

Volume ratio of treating solution to catalyst/liquid/wax slurry in 1–5:1 range, and preferably is 1.5–4.5:1.

Whenever the catalyst/wax slurry to. be treated has a wax melting temperature above about 50° C., or less than about 10° C. below the treating temperature, diluting the catalyst/wax slurry with a light hydrocarbon solvent such as heptane, hexane, or light naphtha may be necessary to facilitate catalyst separation and rapid settling of the catalyst fines following the catalyst/wax treatment step. Following the mixing step in which the catalyst/liquid/wax slurry is contacted by the treating solution, substantially all of the catalyst fines are usually separated from the hydrocarbon liquid/wax slurry product and the treating solution within less than about 10 minutes, and preferably less than 6 minutes, so that the hydrocarbon liquid/wax product becomes essentially visually clear.

It is a significant advantage of this invention that it provides a method and procedure for efficient separation and rapid settling of essentially all the catalyst fines contained in the liquid/wax product slurry from a F-T synthesis process. This separation method thereby enables successfully producing clean high quality hydrocarbon liquid/wax products, recovering the treating solution for reuse, and recycling a portion of the separated catalyst fines back to the F-T reactor if desired for reuse in an efficient manner.

BRIEF DESCRIPTION OF DRAWINGS

FIG. 1 is a schematic flowsheet showing the method steps for treating and separating fine iron-based catalyst particles from a catalyst/hydrocarbon liquid/wax slurry withdrawn from a Fischer-Tropsch synthesis process, and producing a substantially clean hydrocarbon liquid product.

DESCRIPTION OF INVENTION

As shown in FIG. 1, a product stream withdrawn from a Fischer-Tropsch (F-T) synthesis process reactor (not shown) is provided at 10 and includes a catalyst/oil/wax slurry. The iron-based catalyst in the slurry contains 5–95 wt % iron, and has a particle size range of <1 to 100 microns and usually less than about 10 microns. Usual conditions for slurry stream 10 are 10–250° C. temperature and 0–500 psig pressure, and are preferably 20–200° C. and 5–450 psig. A suitable aqueous treating solution is provided at 12 and preferably includes a surface tension reducing agent, an agglutinating agent and a coalescing agent for the catalyst fines. The treating solution is mixed with the product slurry stream 10 by a suitable hydraulic mixing device 14 such as a spray nozzle, for providing intimate contact between the treating solution and the slurry material. The resulting catalyst/oil/wax solution mixture at 15 is fed into a pressurizable settling tank 16, which is suitably sized to provide up to about 15 minutes residence time for the stream 15. Alternatively, the intimate mixing of the treating solution 12 with the product slurry stream 10 can occur within the upper portion of the settling tank 16 by utilizing suitable known mixing means (not shown).

In the settling tank 16, the catalyst fines are separated from the oil/wax material due to particle agglomeration and coalescing action effected by the treating solution on the catalyst fines, and the coalesced catalyst clusters or globules rapidly settle by gravity into the bottom portion 18 of the tank 16. The resulting oil/wax product, which is preferably substantially free of catalyst fines, is removed as overhead product oil/wax liquid stream 20. The treating solution and the concentrated catalyst slurry are withdrawn from the bottom portion 18 of settling tank 16 as stream 22, and are passed to a treating solution recovery step at tank 24.

From the recovery tank 24, the recovered treating solution is removed overhead at 25, and may be recycled back to the mixing device 14 or the treating vessel 16 as the treating solution 12. Make-up treating solution can be added at 13 to the treating solution 12 as needed. A concentrated catalyst slurry stream is withdrawn at 26, and a portion of the catalyst may be recycled at 27 back to the F-T synthesis process reactor feed stream (not shown) for reuse if desired. The remaining spent catalyst is discarded at 28, and is substantially equally in amount to fresh iron-based catalyst added to the Fisher-Tropsch synthesis process This invention will be further disclosed by aid of the following examples, which should not be construed as limiting the scope of the invention.

EXAMPLE 1

2 ml of liquid paraffin containing 3 wt. % of iron-based F-T process catalyst fines with carbon deposition and having a particle size of <325 mesh, was stirred together with 4 ml of treating solution which contains 50% 2-propanol, 0.5% methyl cellulose, and 0.5% of EDTA at 20° C. room temperature and atmospheric pressure. After such mixing, at least 90% catalyst/oil separation and catalyst settling was observed in less than 5 minutes time.

EXAMPLE 2

2 ml of liquid paraffin/catalyst slurry as in Example 1 was stirred with 4 ml of treating solution which contains 50% ethanol, 0.5% methyl cellulose and 0.5% EDTA at 20° C. room temperature and atmospheric pressure. After the mixing, at least 90% catalyst/oil separation was observed in less than 5 minutes.

EXAMPLE 3

2 ml of liquid paraffin/catalyst slurry as in Example 1 was stirred with 4 ml of treating solution which contains 50% 2-propanol, 0.5% methyl cellulose and 0.5% methyl sulfoxide at 20° C. room temperature and atmospheric pressure.

After the mixing, at least 90% catalyst/oil separation was observed in less than 5 minutes.

EXAMPLE 4

2 ml of liquid paraffin/catalyst slurry as in Example 1 was stirred with 4 ml of treating solution, which contains 50% ethanol, 0.5% methyl cellulose and 0.5% methyl sulfoxide at 20° C. room temperature and atmospheric pressure. After such mixing, at least 90% catalyst/oil separation was observed in less than 5 minutes.

EXAMPLE 5

2 ml of paraffin wax (melting point 56–61° C.) containing 6 wt.% of carbon-deposited iron F-T catalyst fines in suspension was stirred with 4 ml of treating solution, which contains 50% 2-propanol, 0.5% methyl cellulose and 0.5% EDTA at 75° C. temperature and atmospheric pressure. After such mixing, clear paraffin wax was obtained by settling of catalyst fines in 10 minutes time.

EXAMPLE 6

2 ml of paraffin wax containing catalyst fines as in Example 5 was stirred at 75° C. temperature with 4 ml treating solution, which contains 50% ethanol, 0.5% methyl cellulose, and 0.5% EDTA. After such mixing, at least 90% catalyst/wax separation was observed in less than 10 minutes.

EXAMPLE 7

2 ml of liquid paraffin wax/catalyst slurry as in Example 5 was stirred with 4 ml treating solution, which contains 50% ethanol, 0.5% methyl cellulose and 0.5% methyl sulfoxide at 75° C. temperature and atmospheric pressure. After such mixing, at least 90% catalyst/wax separation was observed in less than 10 minutes.

EXAMPLE 8

4 ml of liquid paraffin containing 10 wt% of −325 mesh carbon-deposited iron F-T catalyst fines in suspension was treated with 2 ml of treating solution having same composition as in Example 5 at 80° C. temperature and atmospheric pressure. After such mixing, clear paraffin wax was obtained by settling of coalesced catalyst fines in 5 minutes.

EXAMPLE 9

4 ml of liquid paraffin/catalyst slurry as in Example 8 was treated with 2 ml of treating solution with same composition as in Example 6 at 80° C. temperature and atmospheric pressure. After such mixing, clean paraffin was obtained by settling of coalesced catalyst fines in 5 minutes.

EXAMPLE 10

2 ml of liquid $C_{30}$ hydrocarbons (Durasyn 164) containing 7 wt % of −325 mesh carbon-deposited iron catalyst fines in suspension was stirred with 2 ml of treating solution as in Example 1 at 20° C. room temperature and atmospheric pressure. After such mixing, at least 90% catalyst/oil separation was observed in less than 5 minutes.

EXAMPLE 11

2 ml of liquid Durasyn 164/catalyst slurry as in Example 10 was stirred with 2 ml of treating solution, which contains 33% of 2-propanol, 0.5% methyl cellulose and 0.5% of EDTA at 20° C. room temperature and atmospheric pressure. After such mixing, at least 90% catalyst/oil separation was observed in less than 5 minutes.

EXAMPLE 12

2 ml of liquid Durasyn 164/catalyst slurry as in Example 10 was stirred with 2 ml of treating solution, which contains 50% 2-propanol, 0.5% methyl cellulose and 0.5% glycerin at 20° C. room temperature and atmospheric pressure. After such mixing, at least 90% catalyst/oil separation was observed in less than 5 minutes.

EXAMPLE 13

2 ml of Durasyn 164/catalyst slurry as in Example 10 was stirred with 2 ml of treating solution, which contains 33% 2-propanol, 0.25% methyl cellulose. and 0.5% glycerin at 20° C. room temperature and atmospheric pressure. After such mixing, at least 90% catalyst/oil separation was observed in less than 5 minutes.

EXAMPLE 14

2 ml of Durasyn 164/catalyst slurry was stirred with 2 ml of treating solution as in Example 10 but at 50° C. temperature and atmospheric pressure. After such mixing, at least 90% catalyst/oil separation is observed in 3 minutes.

EXAMPLE 15

2 ml of Durasyn 164/catalyst slurry was stirred with 2 ml of treating solution as in Example 10 at 70° C. temperature and atmospheric pressure. After such mixing, at least 90% catalyst/oil separation was observed in 3 minutes.

EXAMPLE 16

2 ml of Durasyn 164/catalyst slurry as in Example 8 was stirred with 2 ml of treating solution recovered from Example 8 at 50° C. temperature and atmospheric pressure. After such mixing, at least 90% catalyst/oil separation was observed in 7 minutes.

EXAMPLE 17

4 ml of Durasyn 164 containing 10 wt.% of −325 mesh carbon-deposited iron catalyst fines in suspension was stirred with 2 ml of treating solution as in Example 1 at 80° C. temperature and atmospheric pressure. After such mixing, at least 90% catalyst/oil separation was observed in about 5 minutes.

EXAMPLE 18

4 ml of Durasyn/catalyst slurry as in Example 17 was stirred with 2 ml of treating solution as in Example 2 at 80° C. temperature and atmospheric pressure. After such mixing, at least 90% catalyst/oil separation was observed in 5 minutes.

EXAMPLE 19

1 gm of catalyst/hard wax mixture from long-term F-T synthesis process operations and which contains 43.9 wt.% of fine iron-based catalyst was diluted with 2.8 gm of heptane, and stirred with 1.6 gm of 2-propanol and 1.8 gm of treating solution as in Example 1 at 80° C. temperature and atmospheric pressure. After such mixing, at least 90% catalyst/wax separation was observed after gravity settling of 15 minutes.

EXAMPLE 20

1 gm of catalyst/hard wax mixture as in Example 19 was stirred with 1.6 gm of ethanol and 1.8 gm of treating solution as in Example 7 at 80° C. temperature and atmospheric pressure. After such mixing, catalyst/hard wax separation was observed after 15 minutes settling time.

Based on the experimental Examples of catalyst slurry mixing and settling conditions and results, it is apparent that the fine-sized iron-based catalyst particles contained in catalyst/waxy slurry withdrawn from Fischer-Tropsch synthesis processes can be readily separated from the hydrocarbon liquid/wax products by enhanced coalescence and gravity settling caused by intimate contact with the treating solutions in less than 10 minutes and usually in less than 6 minutes in accordance with this invention. But for catalyst/wax slurries containing high molecular weight hard wax, up to about 15 minutes catalyst settling time may be required. Although such coalescence enhanced settling of the fine catalyst particles in the product hydrocarbon liquid/wax can be accomplished at 20° C. room temperature, catalyst settling time is reduced at the increased mixing temperatures of 50–80° C. depending on the melting temperature of the wax product. Also, the catalyst settling times are reduced by utilizing increased ratios of the treating solution to the catalyst slurry product, all within elapsed times less than about 10 minutes.

Although this invention has been disclosed broadly and also identifies specific preferred embodiments, it will be understood that modifications and variations can be made all within the scope of the invention as defined by the following claims.

I claim:

1. A method for separating iron-based catalyst fines from hydrocarbon liquid/wax/catalyst slurry for Fischer-Tropsch (F-T) synthesis processes, comprising the steps of:
   (a) providing in a pressurable container a slurry of iron-based catalyst fines and hydrocarbon liquid/wax product obtained from a F-T synthesis process, said catalyst fines having particle size smaller than about 100 micron;
   (b) mixing said catalyst/liquid/wax slurry with an aqueous treating solution, said solution including an interfacial tension reducing component, an agglutinating component and a catalyst coalescing component, with the volume ratio of said treating solution to the catalyst/wax slurry being 0.5–5:1;
   (c) maintaining in said pressurizable container catalyst mixing and settling conditions of 10–250° C. temperature and 0–500 psig pressure sufficient to maintain said treating solution in liquid form, and for sufficient time after said mixing to provide coalescence enhanced separation and gravity settling of at least about 90% of the catalyst fines in said container bottom portion; and
   (d) removing overhead from said container a hydrocarbon product stream, and withdrawing said treating solution and the resulting settled catalyst fines from said container lower portion.

2. The catalyst/wax separating method of claim 1, wherein said catalyst contains 5–95 wt. % iron.

3. The catalyst/wax separating method of claim 1, wherein said treating solution interfacial tension reducing component is 1–80 vol. % ethanol, 2-propanol, or higher alcohols in water solution.

4. The catalyst/wax separating method of claim 1, wherein said treating solution agglutinating component agent is acrylic acid, polyacrylic acid, or methyl cellulose having 0.001–10 vol. % concentration in water solution.

5. The catalyst/wax separating method of claim 1, wherein said treating solution catalyst coalescing component includes ethylenediamine-tetraacetic acid (EDTA), methyl sulfoxide, 2,3-dimercapto-1-propansulfonic acid (DMPS), meso-2,3-dimercaptosuccinic acid (DMSA), diethylenetriamine pentaactic acid (DTPA), having 0.00–10 vol % concentration in water solution.

6. The catalyst/wax separating method of claim 1, wherein the volume ratio of said treating solution to said catalyst/oil/wax slurry is 1.0–4:1.

7. The catalyst/wax separating method of claim 1, wherein said catalyst hydrocarbon liquid/wax slurry is diluted with a light hydrocarbon solvent before mixing said slurry with said aqueous treating solution.

8. The catalyst/wax separating method of claim 1, wherein said mixing and catalyst settling of catalyst/oil/wax slurry with said aqueous treating solution is conducted at 20–200° C. temperature.

9. The catalyst/wax separating method of claim 8, wherein said mixing and catalyst settling pressure is 5–400 psig.

10. The catalyst/wax separating method of claim 1, wherein said mixing of catalyst/oil/wax slurry with said treating solution is conducted by mechanical and/or sonic methods, after which the, catalyst fines settling occurs in less than 15 minutes.

11. The catalyst/wax separating method of claim 1, wherein the coalescence enhanced separation and settling of said catalyst fines from said oil/wax slurry by gravitational settling in the catalyst slurry/treating solution occurs at temperatures of 20–200° C. and pressures of 5–400 psig in less than 10 minutes elapsed time after said mixing step, and produces a substantially clear hydrocarbon liquid product.

12. The catalyst/wax separating method of claim 1, wherein after said catalyst settling the oil/wax phase product is recovered overhead from said pressurizable container as said hydrocarbon product.

13. The catalyst/wax separating method of claim 12, wherein said treating solution is recovered from a recovery stop and recycled back to the catalyst/wax slurry mixing step as said aqueous treating solution.

14. The catalyst/wax separating method of claim 12, wherein said settled catalyst is recovered and a portion recycled back to the catalytic reactor of said F-T synthesis process.

15. A method for separating iron-based catalyst fines from hydrocarbon liquid/wax catalyst slurry for Fischer-Tropsch (F-T) synthesis processes, comprising the steps of:
   (a) providing in a pressureable container a slurry of iron-based catalyst fines and hydrocarbon liquid/wax product withdrawn from a reactor of a F-T synthesis process, said catalyst fines having particle size smaller than 100 micron;
   (b) mixing said catalyst/liquid/wax slurry with an aqueous treating solution which includes an interfacial tension reducing agent which is 1–80 vol % ethanol, 2-propanol, or higher alcohols in water solution, an agglutinating agent which is acrylic acid, polyacrylic acid, or methyl cellulose having 0.001–10 vol % concentration in water solution, and a coalescing agent which is ethylenediamine tetraacetic acid (EDTA), methyl sulfide, 2, 3 dimercapto-1-propane sulfonic acid (DMPS) or meso-2, 3 dimercaptosuccinic acid (DMSA) having 0.001–10 vol % concentration in water solution, the volume ratio of said treating solution to the catalyst/liquid/wax slurry being 1.0–4:1;
   (c) maintaining in said pressurizable container catalyst mixing and settling conditions of 20–200° C. temperature and 5–400 psig pressure for at least about 10 minutes elapsed time after said mixing step and sufficient to provide gravity settling of at least about 90 % of the catalyst fines in said container bottom portion; and
   (d) removing overhead from said pressurizable container a substantially clear hydrocarbon product stream, withdrawing said treating solution and settled catalyst fines from said container lower potion, and recovering at least a portion of said treating solution and catalyst fines.

* * * * *